Jan. 7, 1969
I. STRAUB
3,420,554
COUPLING HAVING INFLATABLE CLAMPING MEANS
Filed Nov. 22, 1965
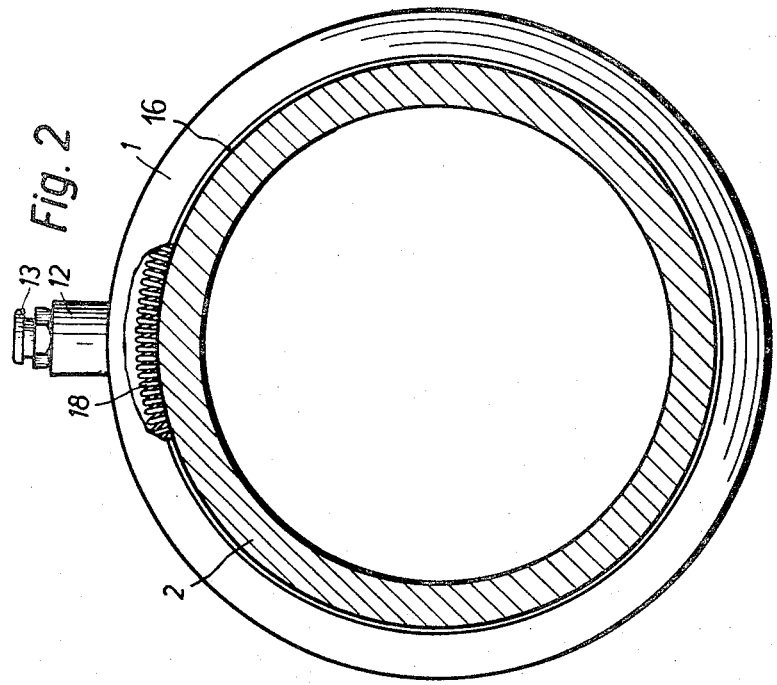
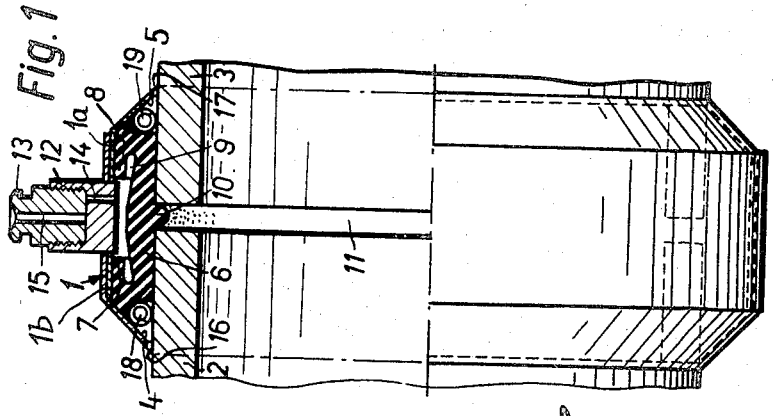
Inventor
Immanuel Straub
By
Karl W. Flocks
Attorney

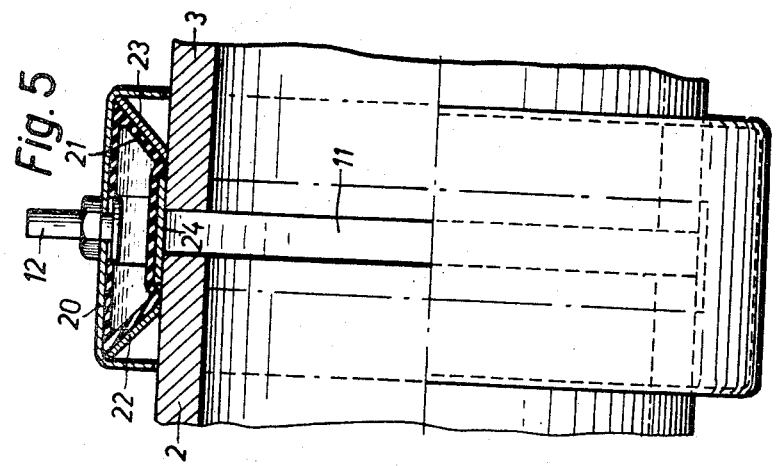
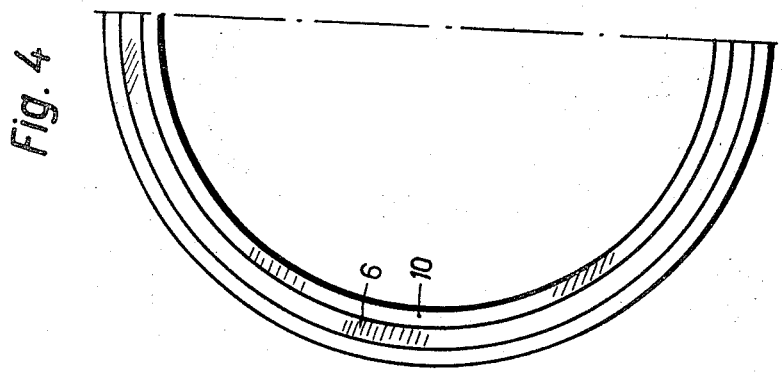
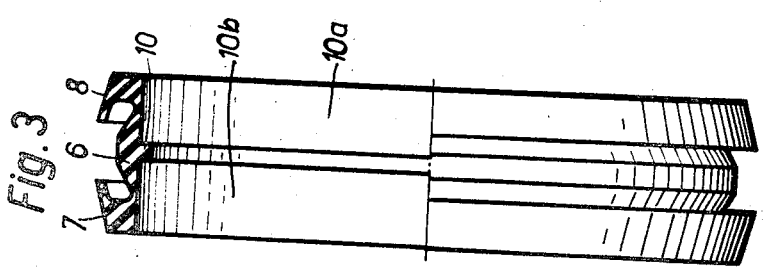

United States Patent Office 3,420,554
Patented Jan. 7, 1969

3,420,554
COUPLING HAVING INFLATABLE
CLAMPING MEANS
Immanuel Straub, Wangs, Saint Gall, Switzerland
Filed Nov. 22, 1965, Ser. No. 508,981
Claims priority, application Austria, Nov. 24, 1964,
A 9,935/64
U.S. Cl. 285—97            9 Claims
Int. Cl. F16l *17/00;* F16l *33/16*

ABSTRACT OF THE DISCLOSURE

A pipe coupling for mechanically joining in sealing relation two ends of a pipe or rod which coupling includes a housing defining a continuous channel opening toward and bridging spaced ends of the pipes or rods to be joined; said channel containing an inflatable clamp means, said clamp means defining spaced apart lips sealingly engaging the interior of said channel.

The invention relates to a coupling for clamping together pipes, tubes, rods, bars, and such like, which coupling can provide a sealing joint between the objects thus connected together.

The prior art discloses many couplings, particularly pipe couplings, which, apart from the special cases comprised of the customary flanges, threaded sleeves, and flanged coupling joints, and such like, are not practicable. The known couplings require, in many cases, that the pipe ends be previously laboriously altered or, otherwise, provided with an end piece of a particular shape.

There are known couplings that can be used with objects not previously altered, such as a plain pipe end, but they require that the dimensions of the object, such as the diameter of the pipe end, fall within a very small tolerance and that the shape of the object be accurate, since even a very small deviation from the ideal dimensions and shape renders the operation of the coupling doubtful.

For this reason, most of these known couplings are not suitable for high pressure lines, because the clamping ring, which serves as the joining and sealing means, is plastically distorted or completely ruined by the high line pressure admitted to the ring through the separation between the two coupled pipe ends. This also results when the clamping ring is an inflatable seal and surrounded by a housing that prevents the ring from expanding outwards in a radial direction, because there is always a certain clearance between the housing and the outer surfaces of the pipes. Upon application of sufficient pressure on the ring, the latter is forced through the clearance and thereby loses its sealing function.

A further disadvantage of some of these couplings is that they are extremely critical with regard to the alignment of the coupled objects. In such couplings the clamping ring is damaged by shearing, impairing the clamping effect of the ring and, in the case of a pipe coupling, rendering its sealing properties doubtful.

Moreover, many of these known couplings cannot clamp the very smooth surfaces of objects such as glass and plastic tubes. Nor can they clamp objects having particularly sensitive or delicate surfaces, such as plated or plastic coated pipe, either because there is insufficient friction between the coupling and the object or because the delicate surface is endangered by the clamping.

An object of the invention is an improved coupling for securing two objects.

Figure 15:
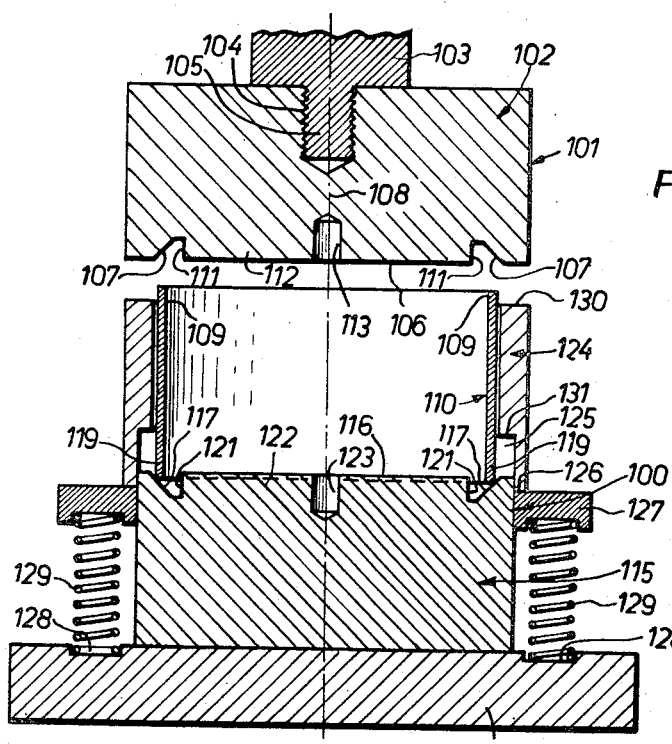
Figure 16:
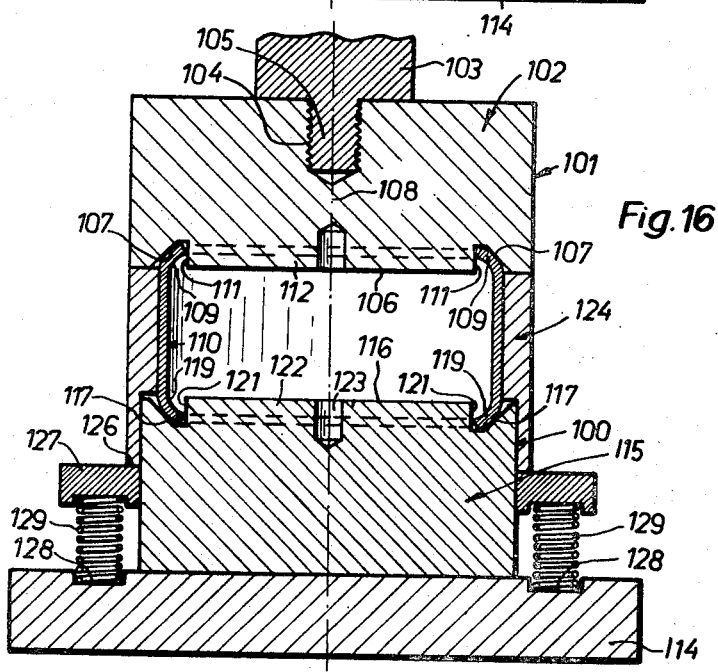

These and further objects of the invention will be apparent from the following detailed description, with reference to the drawings, wherein:

FIGURE 1 is a partly sectional side view of one embodiment of the invention;
FIGURE 2 is a front view, partly broken away, of the form of FIGURE 1;
FIGURES 3 and 4 are side and front views, respectively, of the clamp collar separated from the housing;
FIGURE 5 is a side view, partly in section, of a further embodiment of the invention;
FIGURE 6-14 are side views, in section, of further embodiments of the invention;
FIGURES 15 and 16 are sectional views of the mold arrangement, open and closed, respectively.

The embodiment of FIGURES 1 and 2 is a pipe coupling for joining together in a sealing connection two pipe ends 2 and 3. The coupling of the invention has a housing 1 comprised of two telescoped sections 1a and 1b rigidly joined together, as by welding or other appropriate means, and each having a conical skirt 4, 5. The interior of the housing 1 thus defines a continuous channel. The housing overlaps the two pipe ends 2, 3; but the skirts remain separated therefrom by an annular clearance 16, 17.

A clamp collar 6 (see also FIGS. 3, 4) is located within the groove within the housing and occupies most of the space thereof. The collar 6 takes the form of a sealing sleeve having two opposed cantilever ends 7, 8 of thin cross section that press firmly against the bottom of the channel. Because of the special form of the clamp collar, the latter forms, in cooperation with the housing, a closed cavity 9 that is in communication with the outside through a closable passage of a valve 12, 13, 14, 15.

As illustrated, the valve includes a base member 12 rigidly connected to the housing 1, as by welding or soldering, and interiorly threaded. The threads terminate at a flat seat, and an eccentrically located passage 14 extends from the seat to the cavity. An externally threaded valve body 13, having a central longitudinal passage 15, is received by the member 12. It is apparent that the cavity 9 communicates with the outside, through passages 14, 15, when the valve body 13 is unscrewed the distance of a few threads, and that this communication is sealed off when the body 13 is screwed down tight on its seat. Obviously, valves other than that here pictured and described can be used, as required by the particular application and the pressure medium employed. The invention is not limited to a given valve.

As shown in FIGURES 1 and 2, rings 18, 19, in the form of helical springs and acting as stop means, are located within the groove on either side of the clamp collar 6. In FIGURES 1 and 2 the rings are shown in the position into which they are forced when the cavity 9 is filled with a pressure medium. When the rings are in a relaxed state—that is, the cavity 9 is empty of pressure medium—they have a greater diameter and are located in the corner formed by the bottom of the groove and its skirts 4, 5. A more thorough description of the two possible positions of the stop rings 18, 19 will follow.

In either position the spring rings are compressed by the housing walls. The helix of the ring, however, is substantially incompressible.

It is apparent from FIGURES 1 and 2 that the spring rings 18, 19 act to close off the annular clearances 16, 17 between the housing 1 and the tube ends. Thus, when the cavity 9 is fed a medium (not shown), such as glycerine or a synthetic plastic, under sufficient pressure, the clamp ring 6 is deformed by expansion of the cavity until the stop rings 18, 19 cover the annular clearances, virtually closing off the interior of the groove to the outside, and thereby preventing the collar 6 from being squeezed out through the annular clearances. The addition of more pressure medium causes the clamp collar 6 and its rib 10 to bear more firmly on the pipe ends 2, 3 and the separation 11 between the adjacent ends, improving the frictional coupling between the collar, on the one hand, and the housing 1 and tube ends, on the other. The clamp ring is prevented from expanding into the open by the housing 1, the stop rings 18, 19, the tube ends 2, 3, and the pressure existing in the pipes. In the event that the pressure in the pipe is sufficient to force the rib 10 partly out of the separation 11, the consequent reduction in the volume of cavity 9 increases the pressure therein, thereby improving the sealing by forcing the clamp collar 6 and the stop rings 18 and 19 more tightly around the pipe ends 2, 3.

The collar 6 is appropriately made of an elastic, deformable material, such as a natural or synthetic elastomer, with or without fabric plies. However, as will be later apparent, the collar can be made of plastically (that is, non-elastically) deformable material.

At FIGURES 3, 4 the clamp collar is shown in a relaxed state outside of the housing. As noted, the collar takes the form of a sealing sleeve having two turned back ends 7, 8 of reduced cross section. When the collar is inserted into the housing, these ends are forced downwards towards the body of the collar, whereby each of the surfaces 10a, 10b, flanking the rib 11, is deformed to diverge slightly outwards, to permit a pipe end to be easily slipped in.

The pressure medium can be a gas, but in most instances is preferably a fluid, virtually incompressible, such as an oil, glycerine, or a permanently plastic, flowing synthetic plastic, such as known under the trademark Oronite. However, the plastic, as later noted, can be of a kind that sets within the cavity.

FIGURE 5 illustrates a further embodiment. A U-shaped housing 20 has, for a clamp collar, an annular tube 21 possessing a single opening for the valve 12. A continuous opening, as FIGURES 1 and 2, can be provided in the wall of the tube, if the material of the tube is sufficiently stiff to support the two "wings" thus formed against the top of the housing. On either side of the tube 21 is a conical spring ring 22, 23 acting as the stop ring, which, under action of pressure inside the tube 21, is deformed until it is wedged hard against the tube end 2 or 3. The separation 11 between the pipe ends is covered by a ring 24, which prevents the bottom of the tube from entering the area between the pipes and being damaged, should the pipe edges be sharp. The sealing is effected by the pressure with which the bottom of the tube 21 presses on the outer surfaces of tube ends 2, 3 in the space between the ring 24 and the spring rings 22, 23. The pipes are anchored together chiefly by the wedged-in spring rings 22, 23. The pressure medium within the tube 21 simply presses the under surfaces of the spring rings and a part of the tube 21 uniformly against the pipe ends.

Figure 6:
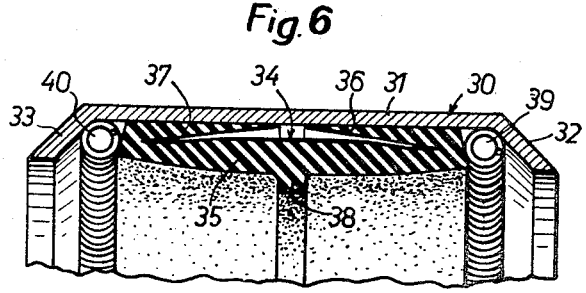
Figure 7:
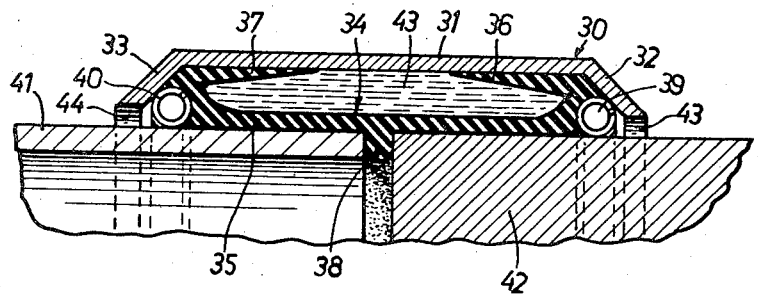

FIGURES 6 and 7 pertain to an embodiment similar to that of FIGURES 1 and 2. FIGURE 6 shows the clamp collar in a relatively relaxed state and without pipes inserted. FIGURE 7 shows the invention under pressure and with pipes attached.

The embodiment has a one-piece ring-shaped housing 30 comprised of a cylindrical portion 31 and two depending divergent skirts 32, 33. In the open channel thus defined there is a clamp collar 34 in the form of a sealing sleeve having a body 35 and two opposed cantilever ends 36, 37. When not under pressure the cavity formed between the body 35 and the ends 36, 37 is of very small volume, because the ends are forced by the inner surface of portion 31 into close proximity with the body 35. For reason of the small cavity there are obtained two advantages: one, the negligible amount of air in the cavity does not have to be exhausted when introducing the pressure medium; two, the inner surface of the collar body 35 diverges somewhat on either side towards the ends, to permit the object, for example a pipe, to be easily inserted. The body 35 has also a central continuous rib 38 that serves to seal the separation between pipe ends, when this embodiment is used as a pipe coupling.

Within the channel there are further two stop rings 39, 40 located between the collar 34 and the skirts 32, 33. As in the embodiment of FIGURES 1 and 2, the rings are comprised of two helical springs bent to form a continuous ring. As seen in FIGURE 6, when the cavity is not under pressure the spring rings are located in the corners formed by the skirts 32, 33 with the cylindrical portion 31 of the housing 30.

FIGURE 7 illustrates the invention coupling together a pipe end 41 and a plug 42 brought up against the rib 38. A pressure madium 43, in the form of a doughy plastic, is fed into the cavity through a valve (not shown) in the housing 30.

As seen in the FIGURE 7, the collar 34 is greatly distorted by the effect of the pressure medium. The ends 36, 37 are pressed against the lower surface of the cylindrical portion 31 and act as sealers preventing the escape of the pressure medium. The thin edges of the ends 36, 37 will generally terminate (as a consequence of the method of production) in small upturned portions (not shown). The edges, of this or any other embodiment, can be intentionally designed with such an upturned portion, which then acts as a first sealer. The stop rings are forced out of their position of rest and down the inner surfaces of the skirts until they are brought up against the pipe end 41 or the surface of plug 42. During this movement the diameter of each ring is necessarily reduced. In consequence of their new position, the rings completely close off the interior of the channel to the annular clearances 43, 44, existing between the skirts 32, 33 and the plug 42 and pipe end 41. As apparent from the FIGURE 7, the collar is so greatly distorted that it occupies all of the available space within the channel. The collar, which is squeezed against the stop rings, is positively prevented from further extension by the action of these rings. The collar positively seals the gap between the pipe end and the plug.

It has been determined that the sealing coupling of FIGURES 6 and 7 faultlessly withstands a line pressure exceeding 30 kg./cm.$^2$, or approximately 426 pounds/square inch.

FIGURES 8–14 illustrate further embodiments, wherein the same relative view in cross section is chosen and the invention is shown under pressure. Elements in these figures corresponding to those of FIGURE 7 are given the same reference numerals. Closable passage means for filling the collar cavity with a pressure medium are not shown, although it will be understood that such is to be provided in any suitable form.

Figure 8:
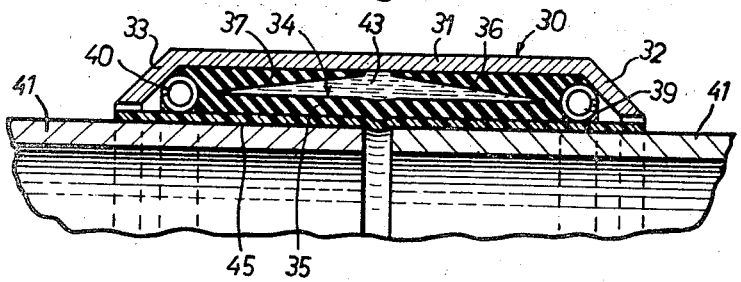

FIGURE 8 illustrates an embodiment for employment as a pipe coupling, useful with conveyed materials incompatible with the composition of the clamp collar, at average line pressures to approximately 40 kg./cm.$^2$. A cylinder 45, at least as long as the corresponding part of housing 30, covers the gap between pipe ends 41 and is borne upon by the collar 34 and the stop rings 39, 40. As shown, the cylinder, drawn over the two pipe ends, can be made of a plastic. However, it can also be wound from a strip and, if desired, cemented to the pipe ends. The cylinder 45 necessarily is made of material that is compatible with the contents of the line, and which is leakproof and semiflexible in its physical properties: a polyamide, a polyvinylchloride, or a polyethylene, for example.

Figure 9:
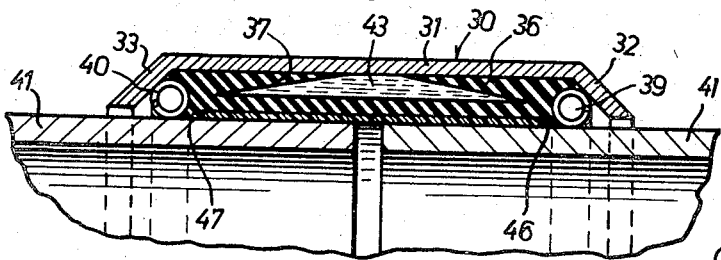

In FIGURE 9, illustrating an embodiment similar to that of FIGURE 8, the cylinder 45 is shorter than the distance separating the stop rings 39, 40, which latter, under pressure, rest directly on the pipe ends 41, while leaving an annular clearance 46, 47 between the stop rings and the adjacent end of the cylinder 45. Under sufficient pressure of the pressure medium 43, the material of the collar 34 "flows" into these two clearances and is forced into direct contact with the pipe walls. Compared to the embodiment of FIGURE 8, that of FIGURE 9 provides a substantially stronger connection, because the frictional contact between the coupling and the pipe ends is substantially increased by the material of the collar squeezed into the clearances 46, 47.

Figure 10:
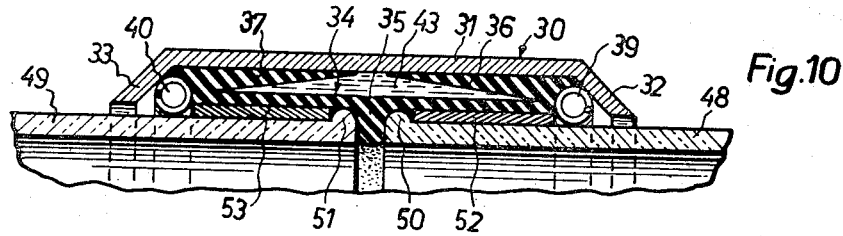

FIGURE 10 pictures a further embodiment for a pipe coupling. The pipes 48, 49 to be coupled are made of glass or quartz and the ends of which, after separation, are customarily somewhat melted to round off the resulting edge. As a result, each pipe end has a bead 50, 51.

In order to employ these beads as the means to increase the tensile strength of the coupling, inserts 52, 53 are provided, lying on the pipe ends, and located between the stop rings 39, 40 and beads 50, 51, and the ends of which contact the respective bead and stop ring. The inserts 52, 53 can be composed of bands made from strip material or of metallic rings. In this embodiment the precaution should be observed that the contents of the line are prevented from contacting the inserts 50, 53 by the collar body 35 being in sealing contact with the beads 50, 51.

For this reason the inserts, in contrast to the cylinders 45 of FIGURES 8 and 9, can be made of a material incompatible with the contents conveyed by the line.

Figure 11:
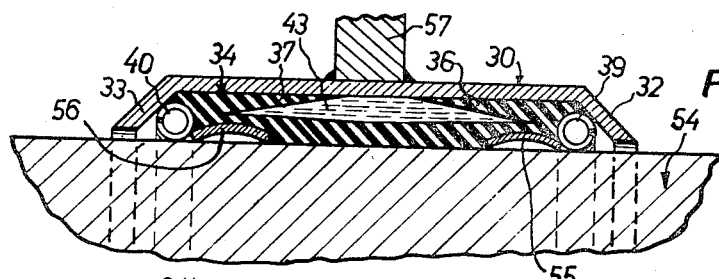

FIGURE 11 relates to an embodiment of the invention which can be employed either as a pipe coupling or as a ring for clamping about a rod—for example, a scaffolding pole 54—or as a shaft coupling for transmitting a torque. In the figure, the invention is shown used as a bracket support, wherein a cross member 57 is rigidly connected to the housing 30. The cross member, of course, is dispensed with if the embodiment is used as a shaft coupling. The embodiment differs from the preceding in that it has one or two inserts 55, 56 embracing the object clamped and having an outwardly convex cross section. The inserts are suitably made of spring steel. In operation—that is, when the clamp collar 34 is distorted by the action of the pressure medium 43 and the stop rings 39, 40 are brought to bear on the pole 54—a further increase in the pressure somewhat flattens out the inserts, as shown in the figure. As a consequence, the edges of the inserts 55, 56 grip the surface of pole 54 with exceeding firmness, the housing 30 and the cross member 57 being virtually immovable on the pole, as long as the pressure of the medium is maintained.

When the embodiment is employed as a pipe coupling, conventional O-rings can be located under each of the inserts 55, 56, which rings, when the inserts are partly flattened out, exercise a supplementary sealing effect.

Figure 12:
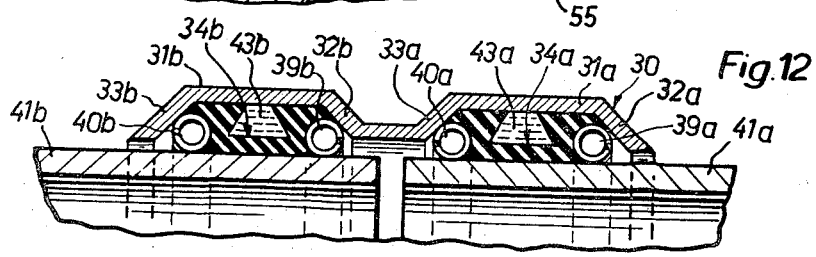

In the further embodiment of FIGURE 12, the housing 30 has two channels, each provided with a clamp collar and two stop rings. In the embodiment, illustrated as a pipe coupling, one channel overlaps pipe end 41a and the other pipe end 41b. Parts corresponding to those of previous embodiments have the same reference numerals, with an added *a* or *b*. This form of the invention is particularly suitable for coupling together pipes having a high internal pressure and for lines of which the pipes are subjected to external forces, such as unsupported pipes laid under ground, in mines and dockyards, etc. The form is also eminently fitted as a shaft coupling, for transmission of a torque. Compared to the earlier embodiments it permits a greater misalignment between the axis defined by the housing 30 and those of the pipes 41a, 41b, without impairing either the sealing or the clamping properties of the coupling.

Figure 13:
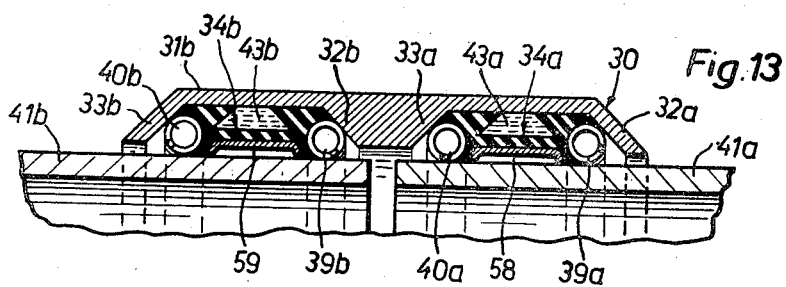

In the form of FIGURE 13, which is a variation of that of FIGURE 12, an insert 58, 59 is located between each clamp ring 34a, 34b and the tube end 41a, 41b. The inserts each comprise two skirts, which, under the pressure of the medium, grip the tube walls, and a flat bottom member joining the skirts together. Under sufficient pressure of the medium, the bottom member will dish inwards. The length of the inserts 58, 59 being smaller than the separation between the stop rings 39a, 40a or 39b, 40b, there exists a clearance between the inserts and the stop rings, into which the material of the clamp collars 34a, 34b, when put under sufficient pressure, is forced and comes to bear on the pipe walls in a sealing relationship therewith. This embodiment is also very tolerant of misalignment between the housing axis and the axis (or axes) of one (or both) pipes.

In the forms of FIGURES 12 and 13 separate valves will be provided for each of the cavities.

Figure 14:
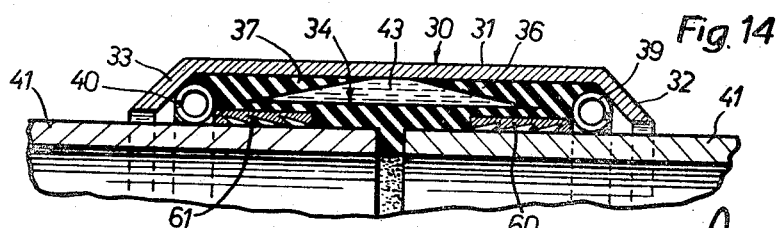

Finally, FIGURE 14 illustrates an embodiment, a variation of FIGURE 11, for a pipe coupling. Located between the clamp collar 34 and the outer surfaces of each pipe end 41 is an annular insert 60, 61, bearing directly on the pipe ends and having a toothed cross section that increases the frictional contact between the coupling and the pipes. The teeth, shown slanting towards the pipe ends, can assume any angle that permits them to grip the pipe ends firmly and to ensure a robust coupling.

Depending on the use to which the embodiment is put, the different forms of the inserts shown in FIGURES 11, 13 and 14 can be substituted one for the other in these embodiments of the invention.

All of the foregoing embodiments have the particular advantage that they form a secure and sealing coupling with pipes of which the ends, as is often the case, have been damaged or deformed in shipment or handling. Moreover, the coupling of the invention will accept and securely and sealingly clamp together two pipes of disparate diameters and/or shapes.

Other embodiments, falling within the scope of the invention, are possible.

Thus, the inserts, located between the clamp collar and the object to be clamped, can be carried by the collar. Moreover, the stop rings, rather than being a conical spring ring or a helical spring bent to form a ring, can be composed of an elastically compressible ring core of a synthetic plastic filament, for example, which core is strung with small, incompressible metal rings or beads, in the manner of a necklace.

The stop ring can also be provided with an outer surface having a suitably high coefficient of friction, and which can have sharp edges, whereby the stop ring, when the coupling is under pressure, tightly grips the object coupled.

It also lies within the scope of the invention to combine a plurality of housings into a unit having a plurality of through bores, each such bore having one or more channels, such as already described, for receiving the clamp collars and stop rings.

It is also possible, in accordance with the invention, to so choose the inserts that the apparatus of the invention, when, for example, it is employed as a shaft coupling, acts purely as a clamp and no longer also as a seal. For example, in FIGURE 11 the inserts 55, 56 could comprise a single insert having a series of such outwardly bowed annular flutes occupying the entire distance between the stop rings 39, 40, whereby that the collar 34 is prevented from contacting—at least to any significant extent—the object 54.

By so choosing the material of the clamp collar and of the pressure medium, as well as the form of the valve, it is possible, according to the invention, to have a coupling, whether or no sealing, that is releasable, that can be reused, or that can be used only once. If the collar is made of a material that is deformable, but not elastically so, the coupling can be used only once. If the pressure medium is a material, such as a plastic, that sets in the cavity, the coupling is permanent in the sense that it can be opened only by breaking it. If the collar is elastically deformable and the pressure medium is of such a nature that it can be withdrawn from the cavity, the coupling is reusable. If the collar is not elastically deformable and the pressure medium can be withdrawn, the coupling is releasable although not reusable.

FIGURES 15 and 16 show the open and closed positions of an arrangement for forming the housing of the invention.

The arrangement essentially comprises a female mold 100 and a male mold or plunger 101. The latter includes a block 102 mounted on the mold holder 103 of a press (not shown) by means of a threaded connection 104, 105. The face 106 of the block 102 opposite the female mold 100 has a working surface 107 in the form of a truncated cone and coaxial with the axis 108 of the male mold. When the mold holder 103 is lowered (FIGURE 16), the working surface 107 engages the upper end 109 of a cylindrical section 110 and presses it to shape. The working surface 107 is joined to a stop face 111 which also is the surface of a calibrating mandrel, which limits the bending of the end 109 and simultaneously determines the interior width of the housing so formed. As shown in the figures, the block 102 is composed of a single piece. However, depending on the size of the block, the latter can be constructed of several parts anchored together. The face 106 has also a centering bore 113, which simply serves to permit exactly aligning the male mold with female mold when the former is mounted on the press.

The construction of the female mold is analogous to that of the male mold, and includes a base plate 114 secured to the block 115 by means not shown. On its face 116 the block has a working surface 117, serving to engage the lower end 119 of the pipe section 110 and press it to shape. The working surface 117 is joined to a stop face 121 which also acts as the surface of a second calibrating mandrel 122, which is coaxial with the axis 108 of the male and female molds. The second calibrating mandrel serves the same purpose for the lower end of the pipe section 110 that the first does for the upper end. The block 115 is shown as a unitary component, although it, also, could be composed of several parts. A centering bore 123, corresponding to bore 113, is also in block 115.

At the time that the molds are set up, the female mold block 115 and thus the female mold itself are brought, by means of a centering pin placed in the centering bores, into precise alignment with the male mold 102 anchored to the holder 103, whereupon the base plate 114 is bolted or otherwise secured to the press work table (not shown).

A holding ring 124, having an inner diameter substantially equal to the outer diameter of the cylinder section 110 guides and holds the section into and with respect to the molds. In order to facilitate the precise guiding of the cylinder or pipe section 110, the holding ring 124 is movable, parallel to the axis 108, from the upper open to the lower closed positions of the molds. For this purpose the holding ring has, at its lower part, a recess 125 (FIGURE 15) that is in nearly playless contact with the female mold block 115. The lower end of the holding ring rests upon a ring support 127 that also is in nearly playless, slidable contact with the block 115 and which is supported by a number of compression springs 129 that are secured to the ring support 127 and in recesses 128 of the base 114. As a consequence of this construction, when the male mold 101 is in its upper, raised position, the springs 128 raise the holding ring 124 to its upper position; whereupon, when the male mold is lowered, the rim of the male mold block 102 contacts the upper end 130 of the holder 124, which latter is forced downward, against the action of springs 128, over the block 115 until the shoulder 131 of the recess 125 comes to rest on the rim of the female mold block face 116. The holding ring 124 performs three functions. First, it centers the pipe section 110 when the latter is inserted and guides its axial movement during the actual forming operation. Second, it prevents any bulging of the pipe wall during forming. Third, it limits the working stroke of the male mold by determining the separation between the male and female molds at the end of the forming.

The manner of operation of the molds of FIGURES 15, 16 is obvious from the above explanation and will not be further described.

Referring to FIGURE 16, it is possible to produce with the apparatus the housing of the embodiments of FIGURE 6–11 and 14 and in the same operation automatically to determine precisely two of its dimensions: the interior width fixed by the calibrating mandrels 112, 122 and the overall length fixed by the holding ring 124.

Further in accordance with the invention the mold arrangement can be modified without sacrificing any of the previously noted advantages. Thus, in addition to making the blocks 100, 101 out of several parts, the holding ring 124, with its ring support 127 and springs 129, can be slidably mounted on the male mold. When the female mold lies in the plane of the press work table, this above construction is of particular importance in order to facilitate automatic operation.

Moreover, the holding ring can be guided in its axial movement by separate guide means, rather than by the female mold block. These means advantageously can be made to swing away from the axis of the molds, whereby to facilitate the insertion of a pipe section and the removal of the formed housing.

It is also possible to provide separate stop means for limiting the working stroke of the male mold and thereby simultaneously precisely determine the overall length of the housing.

I claim:

1. A pipe coupling assembly comprising a clamp, and two cylindrical elements having ends in immediate confronting relation, said clamp comprising a cylindrical housing larger in diameter than the ends of said elements and terminating at each end in a skirt portion extending substantially angularly and outwardly toward the axis of said housing and defining a diameter larger than the element ends; inflatable, annular, one-piece elastic clamping means located within said housing and defining two spaced sides, said sides defining an annular, continuous space opening toward the inner surface of said housing, said sides being located opposite respective sides of said skirt portions of said housing, a continuous wall portion joining said two sides immediately adjacent said element ends, opposite said annular space and surrounding the element ends to be connected together when said clamping means is inflated and providing a seal between the element ends and said continuous wall portion, said sides terminating in opposed, spaced-apart annular lips extending respectively from said sides toward each other, each lip being spaced from said continuous wall portion for contacting and providing a seal with said housing between the ends thereof when said clamping means is inflated, said two sides, continuous wall portion, and two spaced-apart lips defining with said housing a cavity sealed off from said elements being coupled when said clamping means is inflated; closable inlet means on said housing and in communication with said annular space through said housing and adapted to inflate and maintain a constant pressure in said cavity; and at least two annular spring members located between respective ones of said sides of said clamping means and the skirt portions of the housing for imprisoning said clamping means, upon inflation, within the confines of said housing and deterring axial movement of said elements, said annular spring members including portions adapted to engage said skirt portions, said clamping means sides, and portions of said elements spaced from the immediate ends of said elements, a portion of said side wall of the clamping means, when inflated, extending axially outside of and about a portion of said annular spring members.

2. The pipe coupling as defined in claim 1, wherein said inflatable elastic clamping means has a uniform wall thickness.

3. The pipe coupling as defined in claim 2, wherein the element ends to be connected together are separated by a gap, and including an integral annular member bridging the gap between the element ends and preventing contact between at least the very ends of the element, said member being at least sufficiently stiff to prevent said clamping means from being appreciably forced into the gap between the element ends when the clamping means is under pressure.

4. The pipe coupling as defined in claim 1, wherein the element ends to be connected together are separated by a gap, and a semiflexible annular member for bridging the gap between the element ends for forming a seal between the element ends and said wall portion, when said clamp means is inflated, said annular member being sufficiently stiff to prevent said clamping means, when inflated, from being appreciably forced into the gap between the element ends.

5. The structure as claimed in claim 1 in which said elastic clamping means includes an inner annular portion interposed between adjacent ends of said elements.

6. The structure as claimed in claim 1 in which said annular spring members comprise endless helical springs.

7. The structure as claimed in claim 1 in which said annular spring members comprise the frustrum of a cone diverging from the outer surface of said elements toward the inner said housing.

8. The structure as claimed in claim 1 including at least one annular member overlying adjacent ends of said elements and interposed between the outer surface of said element and the inner surface of said continuous wall portion of said clamping means.

9. The structure as claimed in claim 1 in which a plurality of spaced annular elements are circumposed about the outer surface of said cylindrical elements, spaced from the terminal ends thereof and are disposed beneath the continuous wall portion of said inflatable clamping means.

References Cited

UNITED STATES PATENTS

| | | | |
|---|---|---|---|
| 2,523,716 | 9/1950 | Parr | 285—369 X |
| 2,660,458 | 11/1953 | Collins et al. | 285—97 X |
| 2,451,354 | 10/1948 | Ohls | 285—105 |
| 2,465,848 | 3/1949 | Collins et al. | 285—96 X |
| 2,504,936 | 4/1950 | Payne | 285—96 X |
| 2,226,304 | 12/1940 | Dillon | 285—105 X |
| 2,259,543 | 10/1941 | Beyer et al. | 285—105 |
| 3,023,995 | 3/1962 | Hopkins | 285—97 X |

FOREIGN PATENTS

| | | |
|---|---|---|
| 1,241,634 | 8/1960 | France. |
| 140,643 | 2/1962 | Russia. |
| 556,010 | 9/1943 | Great Britain. |

THOMAS F. CALLAGHAN, *Primary Examiner*.

U.S. Cl. X.R.

285—104, 369, 340, 318; 72—354